(12) United States Patent
Hariu et al.

(10) Patent No.: US 11,059,539 B2
(45) Date of Patent: Jul. 13, 2021

(54) STAY FOR SADDLE RIDING VEHICLE

(71) Applicant: HONDA MOTOR CO., LTD., Tokyo (JP)

(72) Inventors: Jun Hariu, Asaka (JP); Akiyuki Karashima, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 272 days.

(21) Appl. No.: 16/276,821

(22) Filed: Feb. 15, 2019

(65) Prior Publication Data

US 2019/0276108 A1   Sep. 12, 2019

(30) Foreign Application Priority Data

Mar. 6, 2018  (JP) .............................. JP2018-039479

(51) Int. Cl.
*B62K 11/04* (2006.01)
*B62K 19/30* (2006.01)

(52) U.S. Cl.
CPC .............. *B62K 11/04* (2013.01); *B62K 19/30* (2013.01)

(58) Field of Classification Search
CPC .. B62J 11/19; B62J 9/21; B62K 11/04; B62K 11/02; B62K 19/30; B62K 19/40
USPC ........................................................ 180/219
See application file for complete search history.

(56) References Cited

U.S. PATENT DOCUMENTS 7,967,337 B2 * 6/2011 Misaki ...................... B62J 27/00
                                                                  280/781
8,044,532 B2 * 10/2011 Miyamoto .................. B62J 6/16
                                                                  307/10.8
9,039,258 B2 * 5/2015 Noguchi ..................... B62J 6/02
                                                                  362/476
9,896,025 B2 * 2/2018 Kato ....................... B60Q 1/0035
2008/0257632 A1 * 10/2008 Takeshima ............. B62D 21/00
                                                                  180/312
2015/0041233 A1 * 2/2015 Imai ....................... B62K 19/48
                                                                  180/219
2016/0288855 A1 * 10/2016 Ueno ..................... B62K 11/14
2017/0015382 A1 * 1/2017 Takakuwa ................ B62J 6/027

FOREIGN PATENT DOCUMENTS

JP       2010-195254          9/2010
JP       2010195254 A    *    9/2010

OTHER PUBLICATIONS

Japanese Office Action dated Dec. 3, 2019, English translation included, 7 pages.

* cited by examiner

*Primary Examiner* — Ruth Ilan
*Assistant Examiner* — Hosam Shabara
(74) *Attorney, Agent, or Firm* — Rankin, Hill & Clark LLP

(57) ABSTRACT

A motorcycle includes a stay, which supports an electric component, an exterior component, and the like, on a front portion of a head tube of a body frame. The stay includes an upper-portion triangular frame body having a triangular shape from a V-shaped portion of a main stay and an upper stay, and at least a part of an ECU supporting portion, which supports an ECU, is disposed inward of the upper-portion triangular frame body. One apex of the upper-portion triangular frame body is positioned on a vehicle front side.

15 Claims, 10 Drawing Sheets

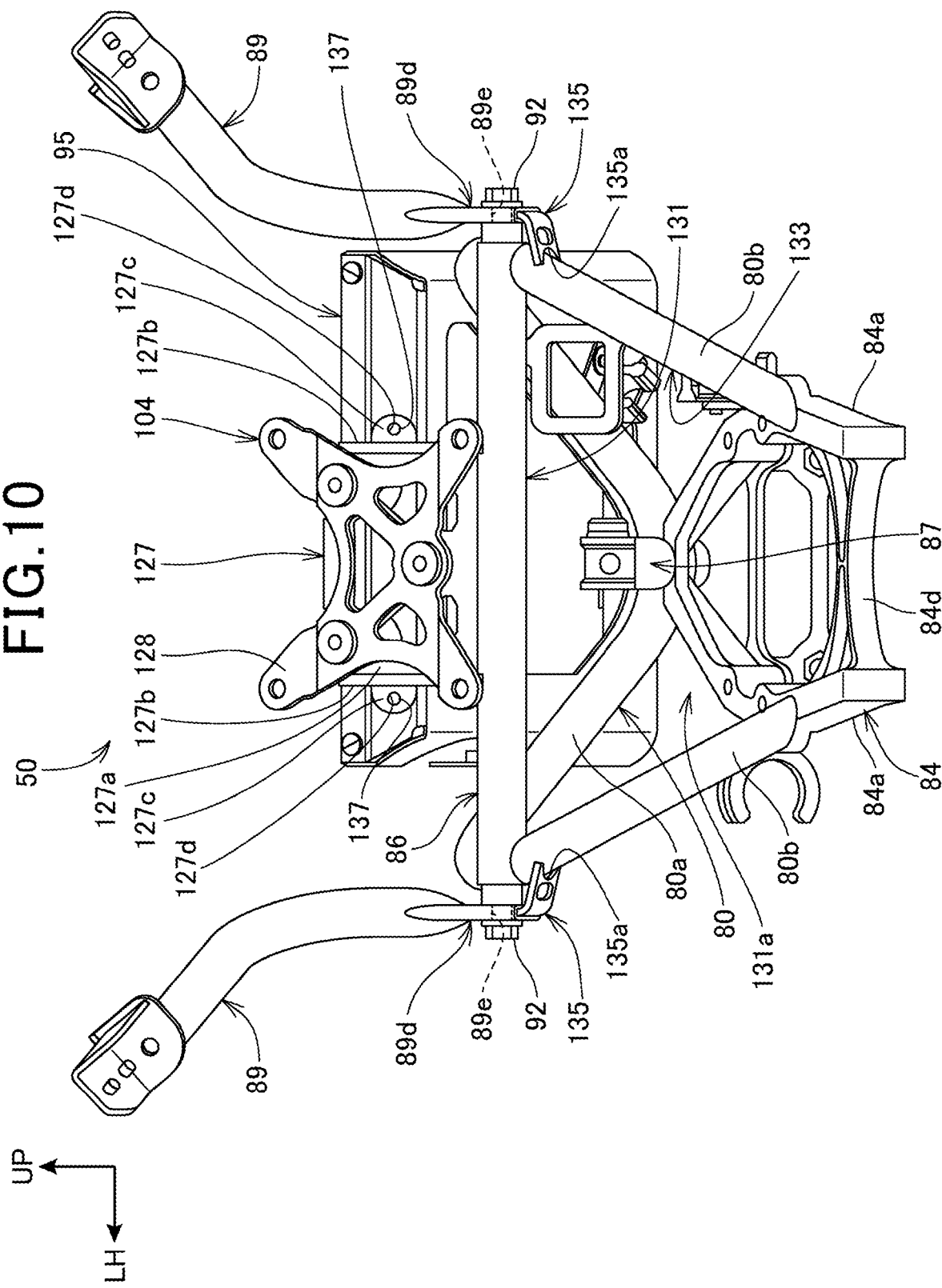

STAY FOR SADDLE RIDING VEHICLE

INCORPORATION BY REFERENCE

The present application claims priority under 35 U.S.C. § 119 to Japanese Patent Application No. 2018-039479 filed on Mar. 6, 2018. The content of the applications is incorporated herein by reference in its entirety.

TECHNICAL FIELD

The present invention relates to a stay for a saddle riding vehicle.

BACKGROUND ART

Conventionally, as a stay for a saddle riding vehicle, the following stay has been known. In the stay, a cover for electric components is mounted on a head tube with a bracket, and a cowl brace is secured to a front portion of the electric component cover. The cowl brace is formed of a frame structure body that supports a cowl (for example, see Patent Literature 1).

CITATION LIST

Patent Literature

[Patent Literature 1] JP-A No. 2010-195254

SUMMARY OF INVENTION

Technical Problem

When electric components are intensively arranged ahead of a head tube for the purpose of, for example, avoidance of influence of heat damage, a space ahead of the head tube is limited and susceptible to external influence. Thus, compactification and ensuring a strength and a rigidity are required at the same time. However, in the configuration in Patent Literature 1, since the cowl brace as a rigid member is extending forward from the cover for the electric components, a front-rear length of the vehicle is likely to be long.

An object of the present invention is to provide a stay for a saddle riding vehicle that easily ensures a strength and a rigidity and ensures compactification.

Solution to Problem

In a first aspect of the present invention, a stay for a saddle riding vehicle is disposed on a front portion of a body frame (10A). The stay for a saddle riding vehicle includes a first frame body (123) having a triangular shape. At least a part of a first electric-component supporting portion (95) is disposed inward of the first frame body (123).

In a second aspect of the above-described invention, one apex (123A) of apices (123A, 123B, and 123C) of the first frame body (123) may be oriented to a vehicle front side.

A third aspect of the above-described invention may include a frame-body supporting portion (87) that couples the one apex (123A) of the first frame body (123) to the body frame (10A).

In a fourth aspect of the above-described invention, the frame-body supporting portion (87) may include an exterior-component supporting portion (87b) that supports an exterior component (32).

In a fifth aspect of the above-described invention, the first frame body (123) and the first electric-component supporting portion (95) may be formed of respective frame bodies having openings (123d, 95f, 95g, 95h, and 95k), and the openings (123d, 95f, 95g, 95h, and 95k) may be disposed adjacent to one another.

A sixth aspect of the above-described invention may include a second frame body (131) using one side of the first frame body (123). The second frame body (131) is different from the first frame body (123). The second frame body (131) may be mounted on the body frame (10A) via a second electric-component supporting portion (84).

A seventh aspect of the above-described invention may include a third electric-component supporting portion (104) supported with one side of the second frame body (131) and the first electric-component supporting portion (95).

In an eighth aspect of the above-described invention, the frame-body supporting portion (87), one side of the first frame body (123), and one side of the second frame body (131) may form a triangular shape in a side view.

In a ninth aspect of the above-described invention, the frame-body supporting portion (87) may be coupled to the second electric-component supporting portion (84), and the frame-body supporting portion (87), the second electric-component supporting portion (84), and the body frame (10A) may form a triangular shape in the side view.

In a tenth aspect of the above-described invention, the first frame body (123) may include an exterior-component supporting portion (89) that supports an exterior component (32), and the exterior-component supporting portion (89) may be detachable from and attachable to the first frame body (123).

In an eleventh aspect of the above-described invention, the exterior-component supporting portion (89) may be supported to the apex (123B, 123C) of the first frame body (123).

Advantageous Effects of Invention

The first aspect of the present invention includes the first frame body having the triangular shape, and at least a part of the first electric-component supporting portion is disposed inward of the first frame body. Thus, including the first frame body having the triangular shape with high strength and rigidity easily ensures a strength and a rigidity of the stay, and supporting the electric component to the first frame body via the first electric-component supporting portion can compactly arrange the electric component and can ensure reduction in size and compactification of the vehicle.

In the second aspect of the above-described invention, one of the apices of the first frame body is oriented to the vehicle front side. This can enhance the strength and rigidity against an external force acting from the vehicle front side.

The third aspect of the above-described invention includes the frame-body supporting portion that couples the one apex of the first frame body to the body frame. Thus, supporting the one apex of the first frame body having the triangular shape with the body frame can more strongly support the first frame body.

In the fourth aspect of the above-described invention, the frame-body supporting portion includes the exterior-component supporting portion that supports the exterior component. Thus, load applied to the exterior component can be received with the frame-body supporting portion to strongly support the exterior component.

In fifth aspect of the above-described invention, the first frame body and the first electric-component supporting portion are formed of the respective frame bodies having the openings, and the openings are disposed adjacent to one another. This can enhance a cooling efficiency of the electric component supported to the first electric-component supporting portion.

The sixth aspect of the above-described invention includes the second frame body, which is different from the first frame body, using the one side of the first frame body, and the second frame body is mounted on the body frame via the second electric-component supporting portion. Thus, a plurality of electric components can be strongly supported, and the electric component supported with the second electric-component supporting portion can be compactly held.

The seventh aspect of the above-described invention includes the third electric-component supporting portion supported with the one side of the second frame body and the first electric-component supporting portion. Thus, using the one side of the second frame body and the first electric-component supporting portion eliminates the need to additionally dispose a stay on which the third electric-component supporting portion is disposed, and the electric component can be compactly held with the third electric-component supporting portion.

In the eighth aspect of the above-described invention, the frame-body supporting portion, the one side of the first frame body, and the one side of the second frame body form the triangular shape in the side view. Thus, supporting the first frame body in the triangular shape with the frame-body supporting portion and the second frame body can more strongly support the first frame body.

In the ninth aspect of the above-described invention, the frame-body supporting portion is coupled to the second electric-component supporting portion, and the frame-body supporting portion, the second electric-component supporting portion, and the body frame form the triangular shape in the side view. This can enhance the strength and rigidity of the stay.

In the tenth aspect of the above-described invention, the first frame body includes the exterior-component supporting portion that supports the exterior component, and the exterior-component supporting portion is detachable from and attachable to the first frame body. Thus, when the exterior component, which is likely to be damaged in, for example, overturning, and the exterior-component supporting portion are exchanged, the exchange can be performed without removing the first frame body and the electric-component supporting portion disposed on the first frame body from the body frame, thus enhancing a working efficiency.

In the eleventh aspect of the above-described invention, the exterior-component supporting portion is supported to the apex of the first frame body. Thus, the external force applied to the exterior component and the exterior-component supporting portion in, for example, overturning can be received with the first frame body having the high strength and rigidity, thus reducing influence that the stay receives from the external force.

BRIEF DESCRIPTION OF DRAWINGS

FIG. 10 is a back view illustrating the stay.

DESCRIPTION OF EMBODIMENTS

Figure 1:
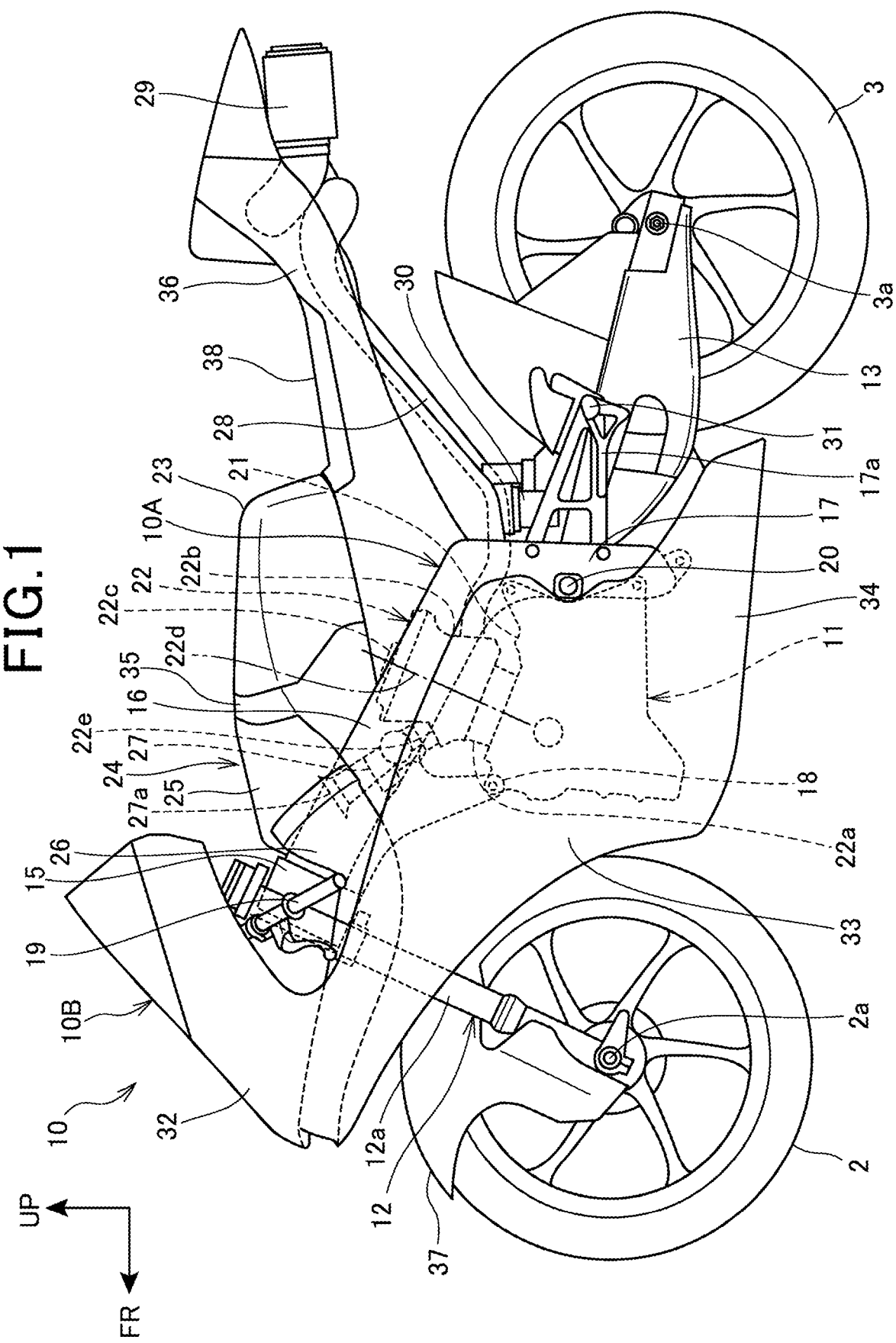
FIG. 1 is a left side view illustrating a motorcycle including a stay according to the present invention.

Hereinafter, one embodiment of the present invention will be described with reference to the accompanying drawings. It is to be noted that, throughout the description, references to directions, such as front, rear, left, right, upward, and downward, are made with reference to a vehicle body, unless otherwise stated. It is also to be noted that, in the drawings, reference sign FR denotes the front of the vehicle body, reference sign UP denotes the upper side of the vehicle body, and reference sign LH denotes the left of the vehicle body.

FIG. 1 is a left side view illustrating a motorcycle 10 including a stay 50 according to the present invention.

In the motorcycle 10, an engine 11 is arranged on a center portion of a body frame 10A, a front fork 12 is steerably supported to a front end portion of the body frame 10A, and a swing arm 13 is vertically swingably supported to a lower portion of the body frame 10A.

A front wheel 2 is supported to a lower portion of the front fork 12, and a rear wheel 3 is supported to a rear end portion of the swing arm 13.

The motorcycle 10 is a saddle riding vehicle including a seat 38 on which an occupant is seated. The seat 38 is disposed on an upper portion of the body frame 10A.

Most parts of the body frame 10A and the engine 11 are covered with a vehicle body cover 10B made of resin.

The body frame 10A includes a head tube 15, a pair of left and right main frames 16, a pair of left and right pivot frames 17, a pair of left and right seat frames (not illustrated), and a pair of left and right down frames 18.

The head tube 15 is disposed on the front end portion of the body frame 10A. The left and right main frames 16 extend rearward and obliquely downward from the head tube 15. The left and right pivot frames 17 extend downward from rear ends of the left and right main frames 16. The left and right seat frames extend rearward and obliquely upward from upper portions of the left and right pivot frames 17. The left and right down frames 18 extend downward and obliquely rearward from lower portions of the left and right main frames 16. The left and right down frames 18 are arranged ahead of and obliquely upward on the engine 11 in side view.

The head tube 15 turnably supports the front fork 12 via a steering shaft (not illustrated). The front wheel 2 is supported to respective lower portions of a pair of left and right fork tubes 12a, which constitute the front fork 12, via an axle 2a. A handlebar 19 is secured to an upper end portion of the front fork 12.

A pivot shaft 20 is secured to the left and right pivot frames 17 such that the pivot shaft 20 extends in a vehicle width direction. The swing arm 13 is swingably supported by the pivot shaft 20. The rear wheel 3 is supported to a rear end portion of the swing arm 13 via an axle 3a.

The engine 11, which is a single-cylinder four-stroke engine, includes a crankcase 21 and a cylinder 22. The cylinder 22 extends upward from a top surface of a front portion of the crankcase 21.

The cylinder 22 includes a cylinder block 22a joined to a top surface of the crankcase 21, a cylinder head 22b joined to the cylinder block 22a, and a cylinder head cover 22c that covers an upper portion of the cylinder head 22b.

The cylinder 22 is inclined rearward, and an axis 22d of the cylinder 22 is also inclined rearward.

The engine 11 is supported to front upper portions and front lower portions of the left and right pivot frames 17 and distal end portions of the left and right down frames 18. The crankcase 21 is positioned under the left and right main frames 16 and ahead of the left and right pivot frames 17. The cylinder head 22b overlaps rear portions of the left and right main frames 16 in side view.

A fuel tank 23 is arranged ahead of the seat 38, above the rear portions of the left and right main frames 16, and above the left and right pivot frames 17.

An intake device 24, which supplies the engine 11 with air, is arranged between the head tube 15 and the fuel tank 23.

The intake device 24 includes an air cleaner 25, a pair of left and right ducts 26, and a throttle body 27.

The air cleaner 25, which is arranged between the head tube 15 and the fuel tank 23 ahead of the fuel tank 23, purifies air. The left and right ducts 26 extend rearward from a front face of the motorcycle 10 and are coupled to the air cleaner 25. The throttle body 27 is coupled to an inlet port 22e on a front face of the cylinder head 22b and has a front end portion on which an air inlet port 27a is provided.

An exhaust pipe 28 is coupled to an exhaust port (not illustrated) of a rear face of the cylinder head 22b. The exhaust pipe 28 extends rearward with passing below the seat 38 and is coupled to a muffler 29 arranged above the rear wheel 3. That is, the engine 11 is what is called a rear exhaust type that takes in air from the front face of the cylinder head 22b and discharges air from the rear face of the cylinder head 22b.

A rear cushion unit 30 is bridged between the swing arm 13 and the body frame 10A.

A pair of left and right steps 31 on which the feet of a rider are placed are respectively disposed on a pair of left and right stays 17a respectively extending rearward from the left and right pivot frames 17.

The vehicle body cover 10B includes a front cowl 32, a pair of left and right center side covers 33, an under cover 34, an upper cover 35, and a rear cover 36.

The front cowl 32 covers the head tube 15 and an upper portion of the front fork 12 from the front. The left and right center side covers 33 cover the engine 11 from the sides. The under cover 34 covers the engine 11 from below. The upper cover 35 covers a space between the air cleaner 25 and the fuel tank 23. The rear cover 36 covers a rear portion of the body frame 10A.

The front wheel 2 is covered with a front fender 37 from above. The front fender 37 is secured to the front fork 12.

Figure 2:
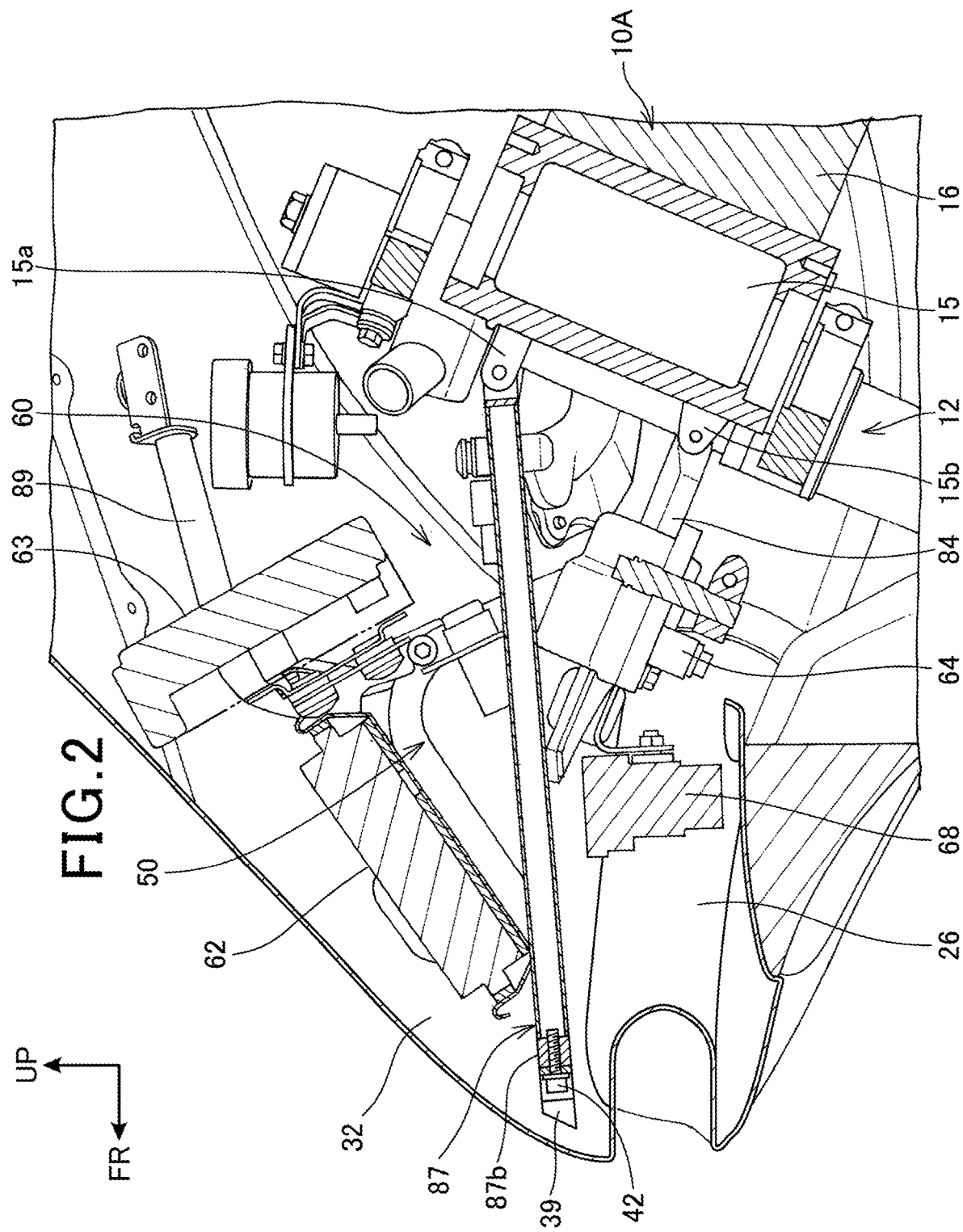
FIG. 2 is a cross-sectional view illustrating a vehicle-body front portion.

FIG. 2 is a cross-sectional view illustrating a vehicle-body front portion and illustrates a cross section along a vertical plane passing through a center in the vehicle width direction.

The head tube 15 includes an upper projecting portion 15a and a pair of left and right lower projecting portions 15b. The upper projecting portion 15a is disposed to project forward on an upper portion of a front portion of the head tube 15. The pair of left and right lower projecting portions 15b are disposed to project forward on a lower portion of the front portion of the head tube 15.

A stay 50, which supports various electric components, various exterior components, and the like, is mounted on the upper projecting portion 15a and the left and right lower projecting portions 15b.

The stay 50, which is arranged ahead of the head tube 15, supports, for example, an Electronic Control Unit (ECU) 62, a meter 63, a steering damper 64, and a bank angle sensor 68 as the electric components and the front cowl 32 as the exterior component.

The left and right ducts 26 and the like are arranged in a space 60 ahead of the head tube 15 in the vehicle body. Accordingly, a space where the above-described stay 50 and the electric components are arranged is limited. Thus, it is required to compactly arrange the stay 50 and the electric components. The stay 50 is positioned at the front portion of the vehicle body and ahead of the body frame 10A. Thus, ensuring a strength and a rigidity is required in preparation for a case where an external force acts.

In the stay 50 in this embodiment, the strength and rigidity are easily ensured, and the electric components can be compactly arranged.

Figure 3:
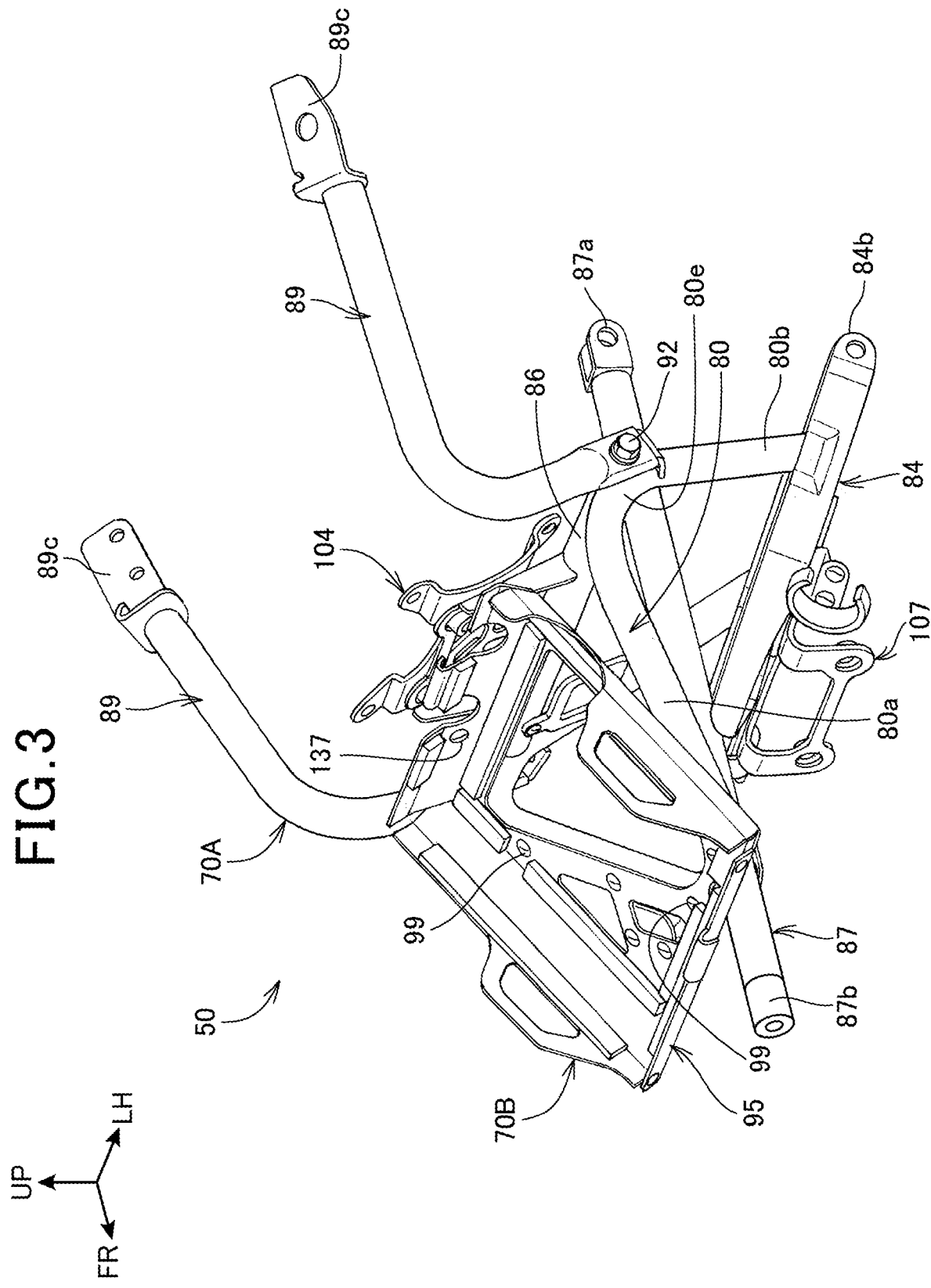
FIG. 3 is a perspective view illustrating the stay.
Figure 4:
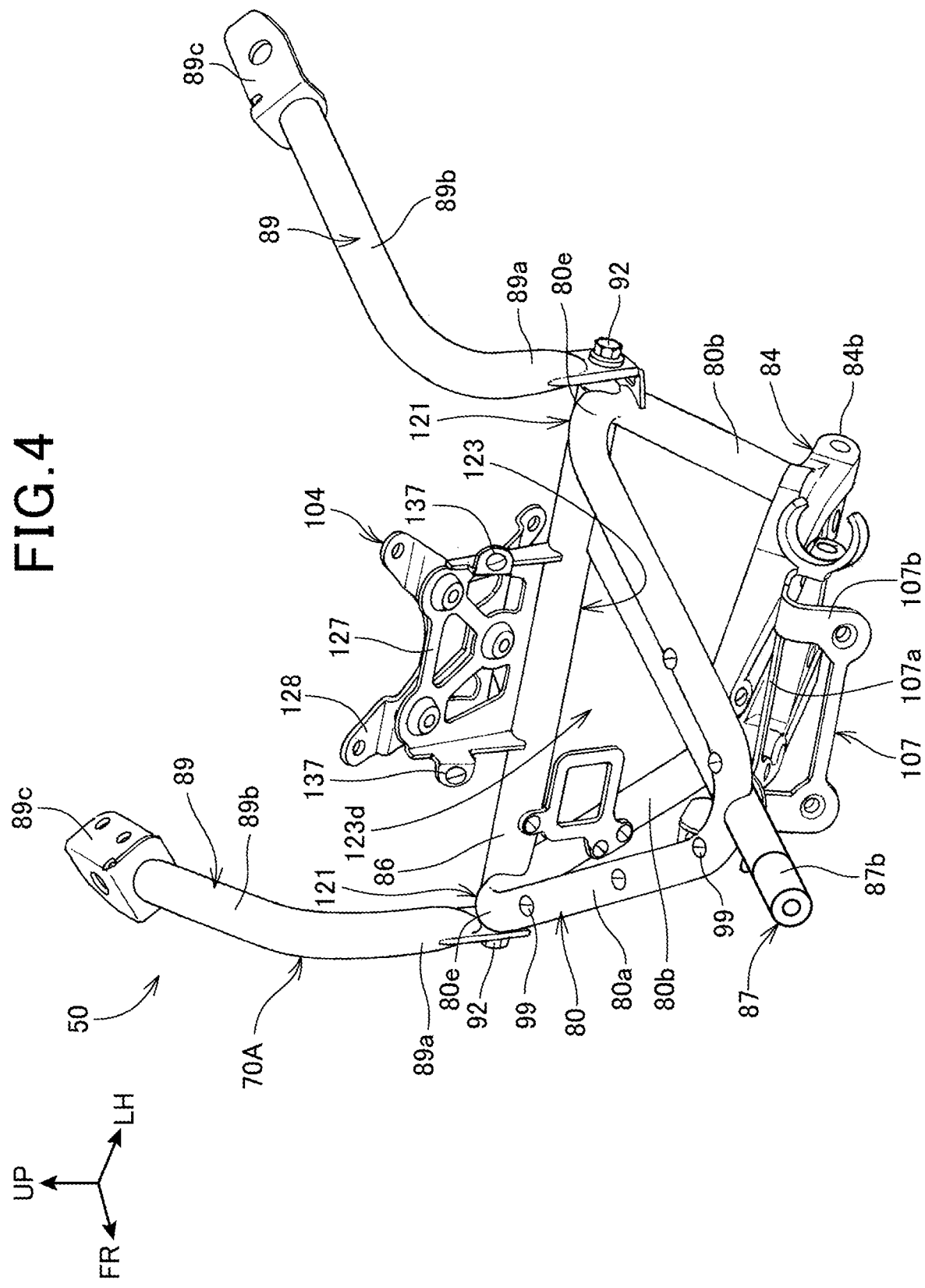
FIG. 4 is a perspective view illustrating a state where an ECU supporting portion has been removed from the stay.

FIG. 3 is a perspective view illustrating the stay 50. FIG. 4 is a perspective view illustrating a state where an ECU supporting portion 95 has been removed from the stay 50.

As illustrated in FIG. 3 and FIG. 4, the stay 50 includes a stay main body 70A and an electric-component supporting portion 70B disposed on the stay main body 70A.

The stay main body 70A is configured from a main stay 80, a lower stay 84, an upper stay 86, a center stay 87, and a pair of left and right side stays 89. The main stay 80, upper stay 86, center stay 87, and pair of left and right side stays 89 are made of tube materials. The lower stay 84 is made of casting or the like but may be formed of the tube material.

The main stay 80 is integrally formed of a V-shaped portion 80a and a pair of left and right lower extending portions 80b. The V-shaped portion 80a has a V shape whose front end is pointed. The pair of left and right lower extending portions 80b extend downward from left and right rear end portions of the V-shaped portion 80a.

The lower stay 84 is coupled to the left and right lower extending portions 80b of the main stay 80 and mounted on the lower projecting portion 15b (see FIG. 2) of the head tube 15 (see FIG. 2) at a head-tube mounting portion 84b (described in detail later) disposed on a rear end portion.

The upper stay 86 is passed to left and right so as to be astride left and right curving portions 80e, which are formed at parts where the V-shaped portion 80a is coupled to the respective left and right lower extending portions 80b in the main stay 80.

The center stay 87 is coupled to a front end portion 80c of the main stay 80 at a front portion and mounted on the upper projecting portion 15a (see FIG. 2) of the head tube 15 at a head-tube mounting portion 87a (described in detail later) disposed on a rear end portion.

The pair of left and right side stays 89 are detachably/attachably mounted on both end portions of the upper stay 86 with respective bolts 92 from an outside in the vehicle width direction.

The electric-component supporting portion 70B includes the ECU supporting portion 95, a meter supporting portion 104, the lower stay 84, and a sensor supporting portion 107.

The ECU supporting portion 95 is mounted on the V-shaped portion 80a of the main stay 80 with a plurality of screws 99 that support the ECU 62 (see FIG. 2). The meter supporting portion 104, which is a part that supports the meter 63 (see FIG. 2), is mounted on the upper stay 86 and the ECU supporting portion 95. The lower stay 84 is a part that supports the steering damper 64 (see FIG. 2). The sensor supporting portion 107, which is a part that supports the bank angle sensor 68 (see FIG. 2), is mounted on the lower stay 84.

Figure 5:
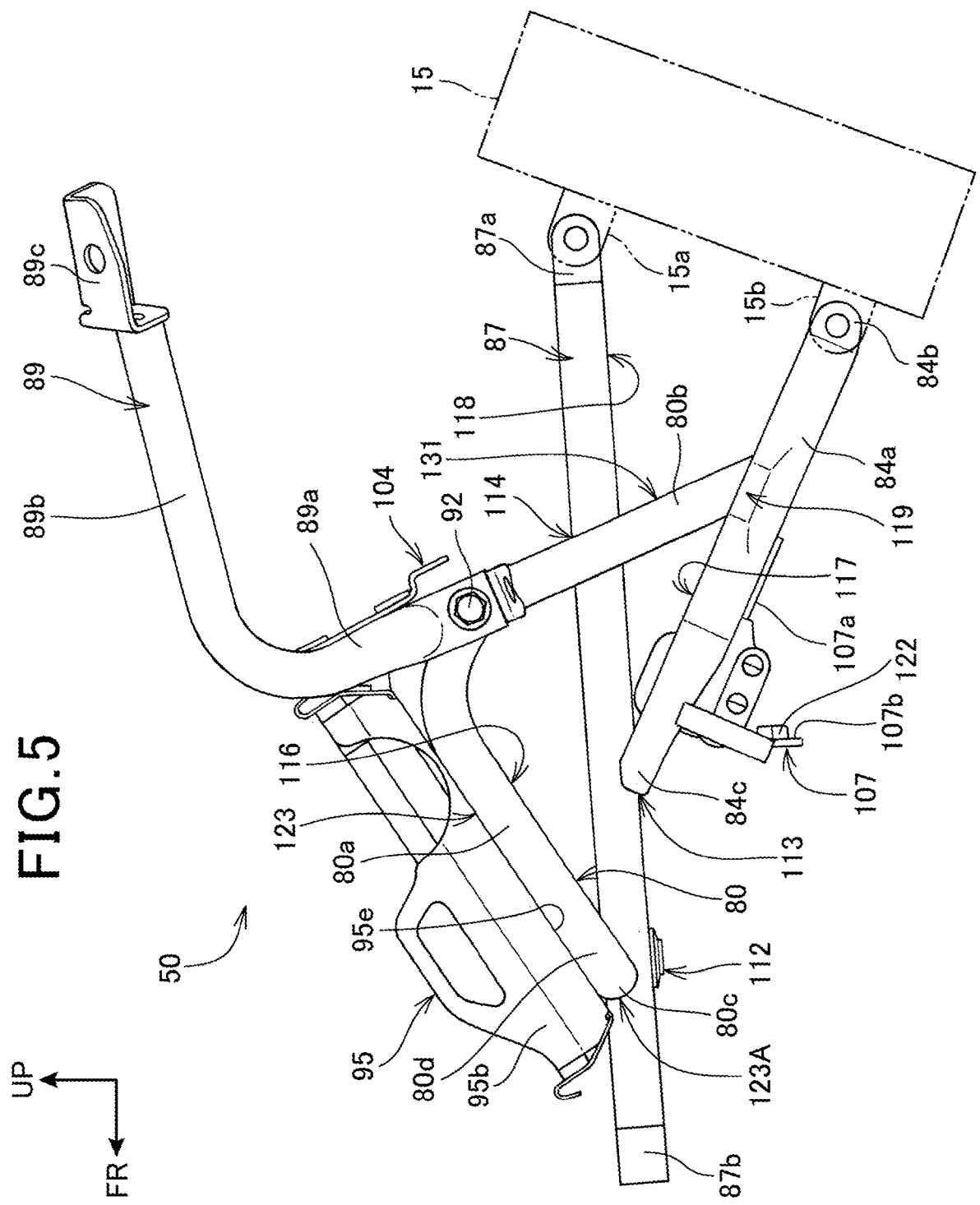
FIG. 5 is a left side view illustrating the stay.

FIG. 5 is a left side view illustrating the stay 50.

In the main stay 80, the V-shaped portion 80a and the lower extending portion 80b are formed into an L shape in side view, and the V-shaped portion 80a is arranged downward to the front. The ECU supporting portion 95 has a bottom wall 95e that is arranged along a top surface of the V-shaped portion 80a. Accordingly, an opening 123d (describes in detail in FIG. 6 and FIG. 7) provided on an upper-portion triangular frame body 123 can be arranged close and adjacent to openings 95f, 95g, 95h, and 95k (describes in detail in FIG. 6 and FIG. 7) provided on the bottom wall 95e of the ECU supporting portion 95.

The lower stay 84 includes a pair of left and right side portions 84a arranged downward to the rear. Respective lower ends of the left and right lower extending portions 80b of the main stay 80 are coupled to respective middle portions in longitudinal directions of the left and right side portions 84a. Respective front ends of the left and right side portions 84a are coupled to the center stay 87, and front ends 84c (also see FIG. 8) of the left and right side portions 84a are coupled to one another. The respective lower ends of the left and right lower extending portions 80b are coupled to the lower stay 84 (specifically, the left and right side portions 84a) with coupling portions 119.

The head-tube mounting portion 84b, which is mounted on the head tube 15, is integrally disposed on a rear end portion of the side portion 84a of the lower stay 84.

The center stay 87, which is straight formed, is extending from the head tube 15 to the vehicle front side. The head-tube mounting portion 87a, which is mounted on the head tube 15, is disposed on a rear end of the center stay 87.

In FIG. 2 and FIG. 5, the center stay 87 has a front end portion 87b that is positioned ahead of a coupling portion 112 of the front end portion 80c of the V-shaped portion 80a to the center stay 87. The front end portion 87b attachably/detachably supports a front end portion of the front cowl 32 via a cowl-side stay 39 disposed on an inner face of the front cowl 32. The cowl-side stay 39 is fastened to the front end portion 87b of the center stay 87 with a bolt 42.

Accordingly, when the external force that acts on the front cowl 32 is applied from the vehicle front side, the body frame 10A (specifically, the head tube 15) having high strength and rigidity can receive the external force via the center stay 87, thus ensuring strong support of the front cowl 32.

In side view, a coupling portion 113 of the lower stay 84 to the center stay 87 is positioned behind the coupling portion 112 and ahead of an intersecting portion 114 where the lower extending portion 80b intersects with the center stay 87 in side view.

In side view, the main stay 80 (the V-shaped portion 80a and the lower extending portion 80b) and the center stay 87 form a triangular portion 116 having a triangular shape in side view. The lower extending portion 80b of the main stay 80, lower stay 84, and center stay 87 form a triangular portion 117 having a triangular shape in side view.

The head tube 15, lower stay 84, and center stay 87 form a side-face triangular frame body 118 having a triangular shape in side view. Thus, the head tube 15, lower stay 84, and center stay 87 being coupled into the triangular shape having high strength and rigidity can strongly support the main stay 80 to enhance the strength and rigidity of the stay 50.

The side stay 89 is formed into an L shape in side view that is formed of a lower side stay 89a and an upper side stay 89b. The lower side stay 89a is arranged along the lower extending portion 80b of the main stay 80. The lower side stay 89a has a lower end portion that is mounted on the end portion of the upper stay 86 with the bolt 92. The upper side stay 89b has a rear end portion on which a cowl supporting portion 89c, which supports the front cowl 32 (see FIG. 1), is disposed.

As illustrated above in FIG. 3 and FIG. 5, the center stay 87 has the front end portion 87b as an exterior-component supporting portion that supports the front cowl 32 (see FIG. 1) as the exterior component.

With this configuration, the center stay 87 can receive load applied to the front cowl 32 to strongly support the front cowl 32.

As illustrated in FIG. 5, the center stay 87 as a frame-body supporting portion is coupled to the lower stay 84 as a second electric-component supporting portion, and the center stay 87, lower stay 84, and body frame 10A (see FIG. 1) (specifically, the head tube 15) form the side-face triangular frame body 118 having the triangular shape in side view. This configuration can enhance the strength and rigidity of the stay 50.

Figure 6:
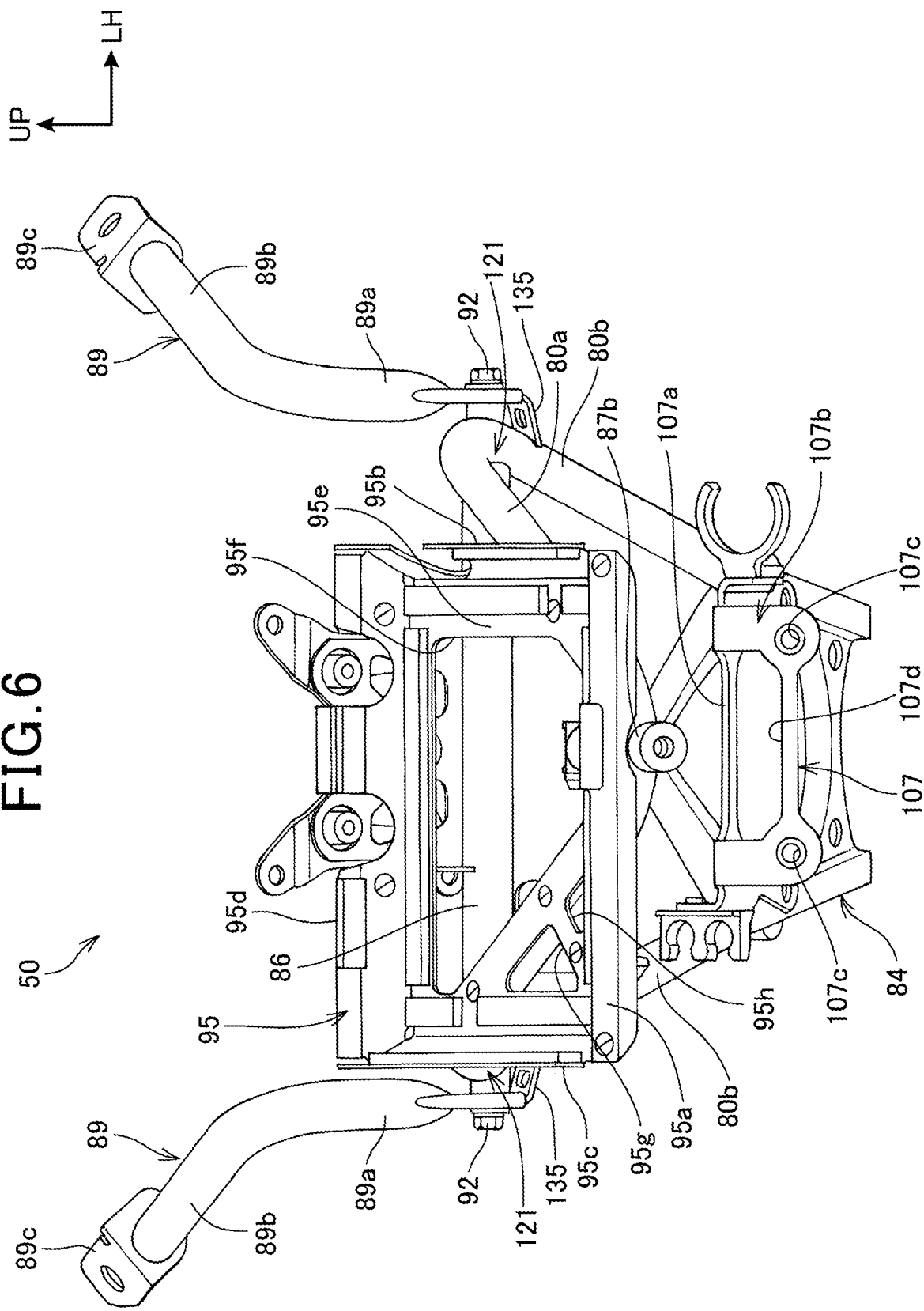
FIG. 6 is a front view illustrating the stay.

FIG. 6 is a front view illustrating the stay 50.

The upper stay 86 has both end portions that project outside of coupling portions 121 of the upper stay 86 to the left and right lower extending portions 80b in the vehicle width direction. The left and right side stays 89 are mounted on both end portions of the upper stay 86.

The ECU supporting portion 95, which is formed into a box shape, includes a front wall 95a, left and right sidewalls 95b and 95c, a rear wall 95d, and the bottom wall 95e. The front wall 95a, left and right sidewalls 95b and 95c, and rear wall 95d each have a lower portion including an inclined portion extending from the bottom wall 95e. The bottom wall 95e has the plurality of openings 95f, 95g, 95h, and 95k (see FIG. 7 for the opening 95k) for weight reduction and ventilation.

The lower stay 84 has a lower portion on which the sensor supporting portion 107 is mounted. The sensor supporting portion 107, which is formed by folding a plate material into an L shape, includes an upper wall 107a and a front wall 107b. The upper wall 107a is mounted on a lower face of the lower stay 84. A plurality of screw insertion holes 107c are opened on the front wall 107b. Screws for mounting the bank angle sensor 68 (see FIG. 2) pass through the plurality of screw insertion holes 107c. Nuts 122 (see FIG. 5) into which the above-described screws are screwed are mounted on a back face of the front wall 107b. An opening 107d is provided on the front wall 107b over the upper wall 107a and the front wall 107b.

Figure 7:
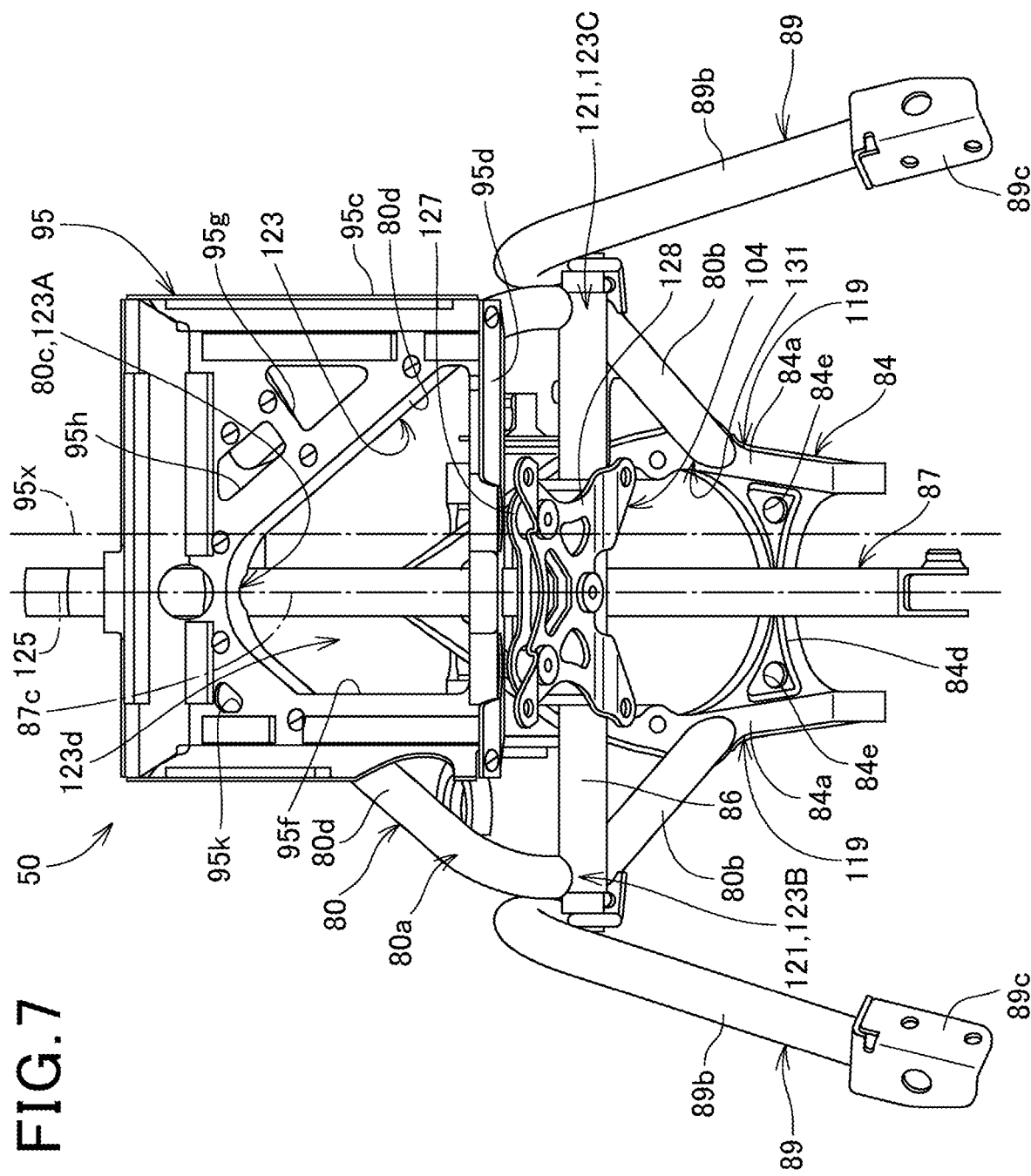
FIG. 7 is a plan view illustrating the stay.
Figure 8:
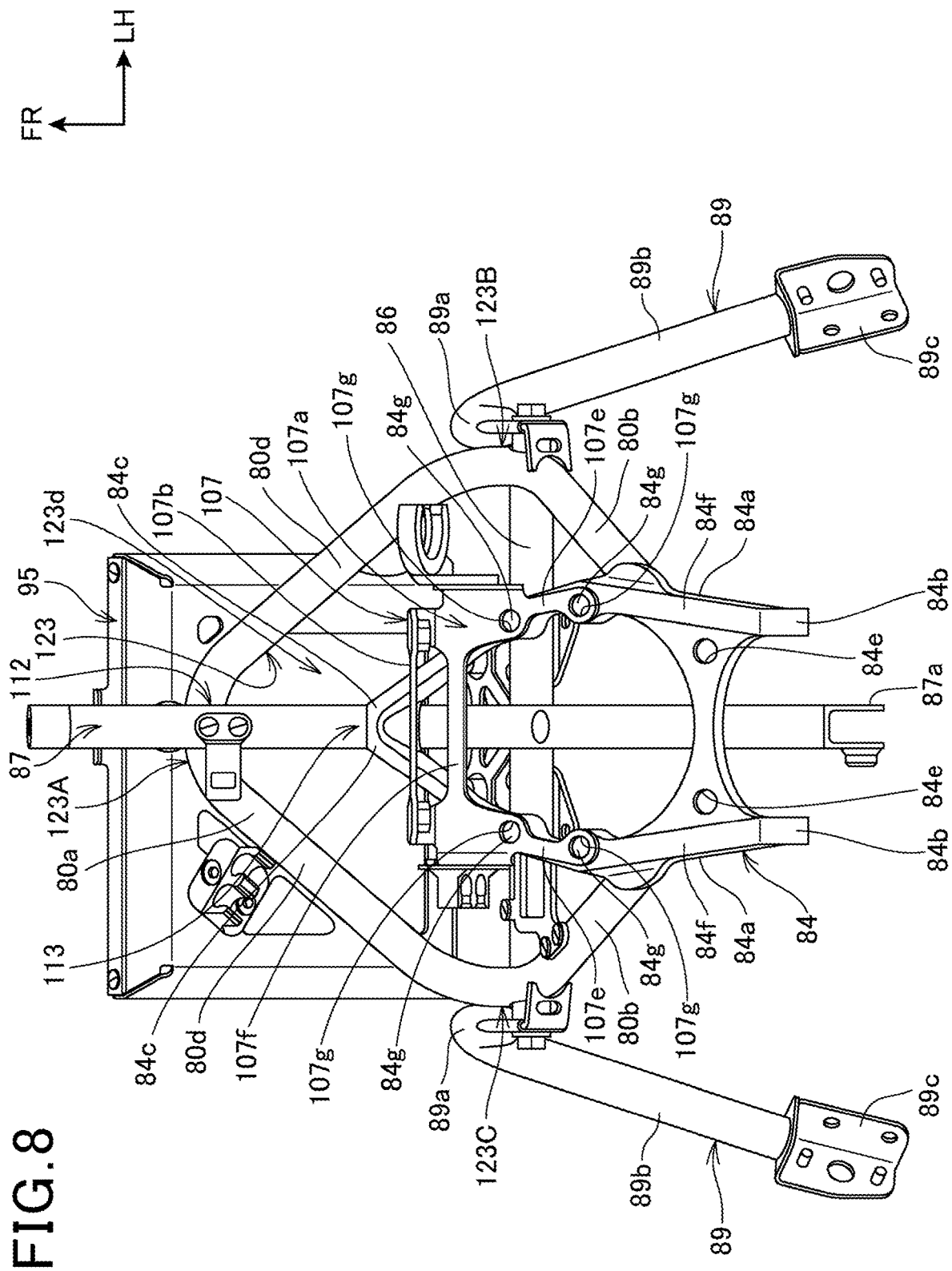
FIG. 8 is a bottom view illustrating the stay.

FIG. 7 is a plan view illustrating the stay 50. FIG. 8 is a bottom view illustrating the stay 50.

As illustrated in FIG. 7, the V-shaped portion 80a of the main stay 80 and the upper stay 86 form the upper-portion triangular frame body 123 having the triangular shape. The upper-portion triangular frame body 123 has three apices 123A, 123B, and 123C. The apex 123A is the front end portion 80c of the V-shaped portion 80a. The apices 123B and 123C are the coupling portions 121 and 121 of the left and right rear end portions of the V-shaped portion 80a to the upper stay 86. The apices 123B and 123C include both end portions of the upper stay 86. The upper-portion triangular frame body 123 internally has the opening 123d.

The ECU supporting portion 95 has a width centerline 95x in the vehicle width direction that is shifted to one side (the right side) in the vehicle width direction with respect to a vehicle-body centerline 125 extending in a front-rear direction through the center in the vehicle width direction. However, a sidewall 95c on the one side (the right side) in the vehicle width direction of the ECU supporting portion 95 is positioned inside the rear end of the V-shaped portion 80a in the vehicle width direction. For example, if the sidewall 95c was arranged outside the rear end of the V-shaped portion 80a in the vehicle width direction, the stay 50 would significantly project outside in the vehicle width direction to increase an occupied space of the stay 50. In contrast, this embodiment can more decrease the occupied space of the stay 50.

The lower stay 84 is integrally formed of the left and right side portions 84a and a coupling portion 84d, which couples the left and right side portions 84a. The coupling portion 84d extends in the vehicle width direction. A pair of left and right bolt insertion holes 84e are opened on the coupling portion 84d. Bolts for mounting the steering damper 64 (see FIG. 2) pass through the pair of left and right bolt insertion holes 84e. Thus, the lower stay 84 doubles as a supporting portion of the steering damper 64.

The center stay 87 has an axis 87c that matches or approximately matches the vehicle-body centerline 125.

The left and right upper side stays 89b are disposed as gradually expanding outside in the vehicle width direction toward the vehicle rear side. Thus, the left and right upper side stays 89b are disposed as being along an inner face of the front cowl 32 (see FIG. 1).

The meter supporting portion 104 is mounted on the upper stay 86 and the ECU supporting portion 95 (specifically, the rear wall 95d). Specifically, the meter supporting portion 104 is formed of a front-portion support plate 127 and a rear-portion support plate 128. The front-portion support plate 127 is passed between the upper stay 86 and the rear wall 95d. The rear-portion support plate 128 is mounted on a back face of the front-portion support plate 127. The rear-portion support plate 128 is elastically supported to the front-portion support plate 127 via an elastic member. The meter 63 (see FIG. 2) is mounted on the rear-portion support plate 128.

As illustrated above in FIG. 1, FIG. 4, and FIG. 7, the motorcycle 10 as the saddle riding vehicle includes the stay 50 as a stay for a saddle riding vehicle on the front portion of the body frame 10A. The stay 50 has the upper-portion triangular frame body 123 having the triangular shape, and at least a part of the ECU supporting portion 95 as a first electric-component supporting portion is disposed inward of the upper-portion triangular frame body 123.

With this configuration, having the upper-portion triangular frame body 123 having the triangular shape with the high strength and rigidity easily ensures the strength and rigidity of the stay 50. Further, supporting the ECU 62 (see FIG. 2) as the electric component inward of the upper-portion triangular frame body 123 via the ECU supporting portion 95 can compactly protect the ECU 62 with the upper-portion triangular frame body 123 as a protective member against the external force.

As illustrated in FIG. 4 and FIG. 7, one apex 123A among the apices 123A, 123B, and 123C of the upper-portion triangular frame body 123 is oriented to the vehicle front side.

Thus, since the apex 123A is arranged on the vehicle front side of the upper-portion triangular frame body 123, the strength and rigidity can be enhanced against the external force acting from the vehicle front side.

The upper-portion triangular frame body 123 as a first frame body and the ECU supporting portion 95 as the first electric-component supporting portion are formed of respective frame bodies having the opening 123d and the openings 95f, 95g, 95h, and 95k, and the opening 123d is disposed adjacent to the openings 95f, 95g, 95h, and 95k one another.

This configuration can enhance a cooling efficiency of the ECU 62 (see FIG. 2) as the electric component supported to the ECU supporting portion 95.

As illustrated in FIG. 5 and FIG. 7, the stay 50 includes the center stay 87 that couples the one apex 123A of the upper-portion triangular frame body 123 to the body frame 10A (see FIG. 1) (specifically, the head tube 15).

With this configuration, supporting the one apex 123A of the upper-portion triangular frame body 123 having the triangular shape with the body frame 10A can more strongly support the upper-portion triangular frame body 123.

As illustrated in FIG. 8, the V-shaped portion 80a of the main stay 80 is integrally configured from a pair of left and right inclined portions 80d inclined with respect to the vehicle front-rear direction. The left and right inclined portions 80d and the upper stay 86 constitute three sides of the upper-portion triangular frame body 123.

A plurality of screw holes 84g are formed on each of bottom surfaces 84f of the left and right side portions 84a of the lower stay 84.

The upper wall 107a of the sensor supporting portion 107 is integrally formed of a pair of left and right front-rear extending portions 107e, which extend in the front-rear direction, and a right-left coupling portion 107f, which couples the left and right front-rear extending portions 107e. Respective bolt insertion holes 107g are opened on the left and right front-rear extending portions 107e. Bolts (not illustrated) passed through the respective bolt insertion holes 107g are screwed into the screw holes 84g of the lower stay 84 to mount the sensor supporting portion 107 on the lower stay 84.

As illustrated in FIG. 5 and FIG. 8, the center stay 87, one side (the inclined portion 80d) of the upper-portion triangular frame body 123, and one side (the lower extending portion 80b) of a trapezoidal frame body 131 as the second frame body form a triangular shape in side view.

With this configuration, supporting the upper-portion triangular frame body 123 in the triangular shape with the center stay 87 and the trapezoidal frame body 131 can more strongly support the upper-portion triangular frame body 123.

Figure 9:
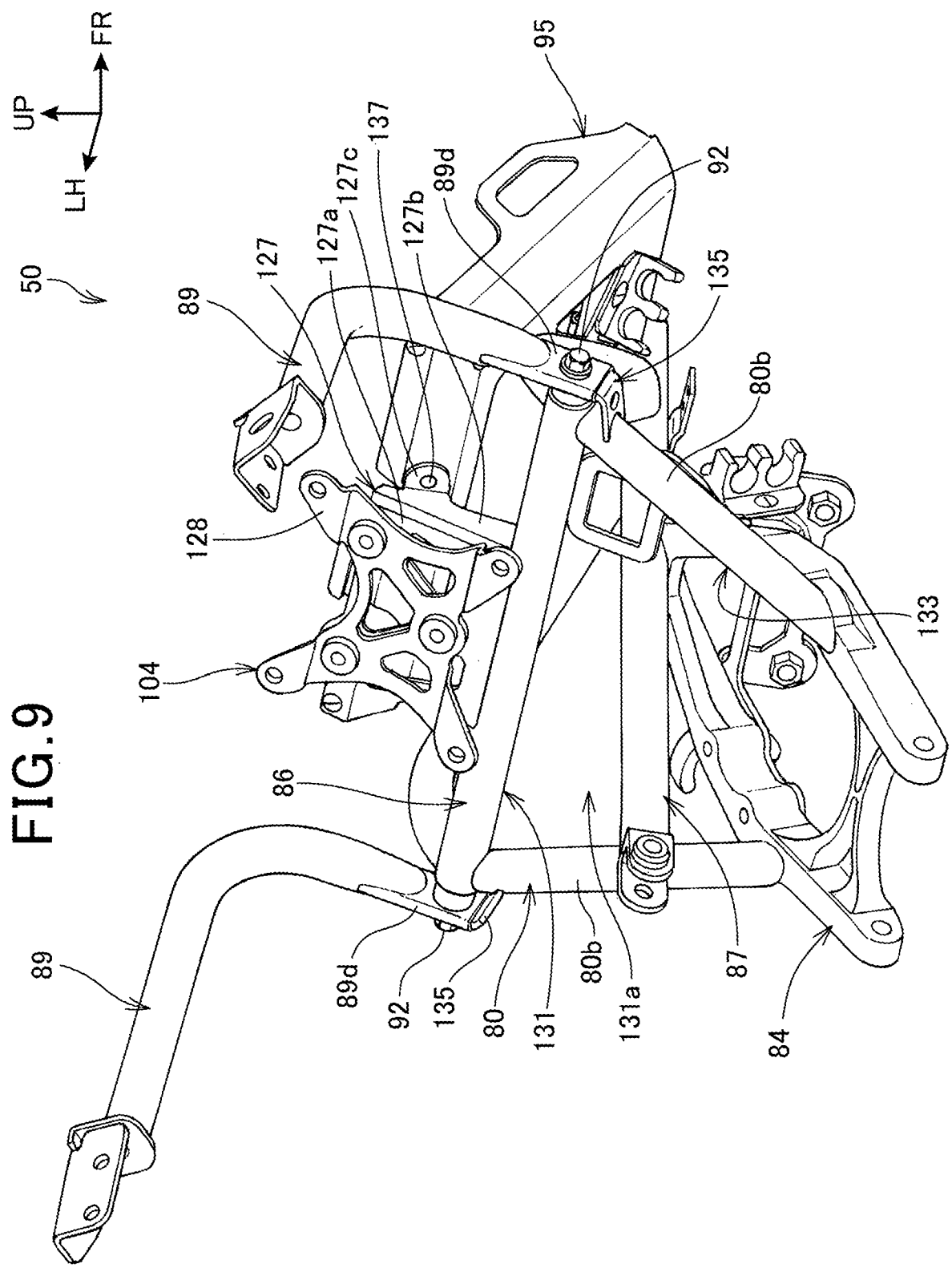
FIG. 9 is a perspective view from an oblique rearward of the stay.

FIG. 9 is a perspective view from an oblique rearward of the stay 50. FIG. 10 is a back view illustrating the stay 50.

As illustrated in FIG. 9 and FIG. 10, the left and right lower extending portions 80b of the main stay 80, the lower stay 84, and the upper stay 86 form the trapezoidal frame body 131 having a trapezoidal shape when viewed in the front-rear direction. The trapezoidal frame body 131 internally has an opening 131a.

The center stay 87, which is disposed to be inserted through the opening 131a in the vehicle front-rear direction, and the trapezoidal frame body 131 form a three-dimensional basket-shaped structure 133.

As described above, forming the trapezoidal frame body 131 and the basket-shaped structure 133 can enhance the strength and rigidity of the stay 50.

The left and right side stays 89 have mounted portions 89d squashed into plate shapes. The mounted portions 89d are mounted on both end portions of the upper stay 86. A bolt insertion hole 89e through which the bolt 92 passes is opened on the mounted portion 89d.

The mounted portion 89d has a distal end portion on which a positioning piece 135, which is disposed to bend with respect to the mounted portion 89d, is mounted.

The positioning piece 135 has a distal end portion on which an arc-shaped cutout 135a is formed. The arc-shaped cutout 135a is fitted along an outer peripheral surface of the lower extending portion 80b of the main stay 80.

Thus, including the positioning piece 135 in the side stay 89 facilitates positioning by fitting the arc-shaped cutout 135a of the positioning piece 135 to the outer peripheral surface of the lower extending portion 80b when the side stay 89 is mounted on the upper stay 86. This eliminates the need to use a jig or the like to set a mounting angle of the side stay 89, for example, when the side stay 89 is mounted. Thus, the side stay 89 can be mounted in a short time and accurately.

The front-portion support plate 127 of the meter supporting portion 104 is integrally formed of a flat-plate-shaped flat plate portion 127a and a pair of left and right side plate portions 127b, which extend forward from both side edges of the flat plate portion 127a. The left and right side plate portions 127b integrally include a rear wall mounting portion 127c mounted on the rear wall 95d of the ECU supporting portion 95. A screw hole 127d is formed on the rear wall mounting portion 127c. The rear wall mounting portion 127c is mounted on the rear wall 95d with a screw 137 screwed into the screw hole 127d from a side of the rear wall 95d of the ECU supporting portion 95. The flat plate portion 127a and the left and right side plate portions 127b are joined to the upper stay 86 by welding.

As described above, configuring the front-portion support plate 127 from the flat plate portion 127a and the left and right side plate portions 127b can enhance the rigidity of the front-portion support plate 127 to reduce vibration transmitted from the vehicle body side to the meter 63.

As illustrated above in FIG. 7 and FIG. 9, the meter supporting portion 104 as a third electric-component supporting portion is provided which is supported by the one side (the upper stay 86) of the trapezoidal frame body 131 as the second frame body and the ECU supporting portion 95.

With this configuration, using the one side of the trapezoidal frame body 131 and the ECU supporting portion 95 eliminates the need to additionally dispose a stay on which the meter supporting portion 104 is disposed and can compactly hold the meter 63 (see FIG. 2) as the electric component with the meter supporting portion 104.

As illustrated in FIG. 9 and FIG. 10, the trapezoidal frame body 131 is provided which is different from the upper-portion triangular frame body 123, using the one side of the upper-portion triangular frame body 123, and the trapezoidal frame body 131 is mounted on the body frame 10A (see FIG. 1) via the lower stay 84.

This configuration can strongly support a plurality of electric components and can compactly hold the steering damper 64 supported by the lower stay 84.

As illustrated in FIG. 10, the upper-portion triangular frame body 123 has the side stay 89 that supports the front cowl 32, and the side stay 89 as an exterior-component supporting portion is detachable from and attachable to the upper-portion triangular frame body 123. Thus, when the front cowl 32 (see FIG. 1), which is likely to be damaged in, for example, overturning, and the side stay 89 are exchanged, the exchange can be performed without removing the upper-portion triangular frame body 123 and the ECU supporting portion 95, which has been disposed on the upper-portion triangular frame body 123, from the body frame 10A (see FIG. 1), thus enhancing a working efficiency.

As illustrated in FIG. 7 and FIG. 10, the side stays 89 are supported to the apices 123B and 123C arranged outside the apex 123A of the upper-portion triangular frame body 123 in the vehicle width direction.

With this configuration, the upper-portion triangular frame body 123 having the high strength and rigidity can receive the external force, which is applied to the front cowl 32 (see FIG. 1) and the side stay 89 in, for example, overturning, thus reducing influence that the stay 50 receives from the external force.

It should be understood that the above-described embodiment is given to illustrate an aspect of the present invention, and various modifications and applications may be arbitrarily made without departing from the spirit of the present invention.

The case where the present invention is applied to the motorcycle 10 has been described; however, the present invention is not limited thereto, but also is applicable to various saddle riding vehicles in addition to the motorcycles 10. The saddle riding vehicle includes general vehicles ridden astride the vehicle body and is a vehicle including not only a motorcycle (including an engine-equipped bicycle) but also a three-wheeled vehicle and a four-wheeled vehicle categorized as All Terrain Vehicles (ATVs).

REFERENCE SIGNS LIST

10 . . . Motorcycle (saddle riding vehicle)
10A . . . Body frame
32 . . . Front cowl (exterior component)
50 . . . Stay
84 . . . Lower stay (second electric-component supporting portion)
87 . . . Center stay (frame-body supporting portion)
87b . . . Front end portion (exterior-component supporting portion)
89 . . . Side stay (exterior-component supporting portion)
95 . . . ECU supporting portion (first electric-component supporting portion)
95f, 95g, 95h, 95k, and 123d . . . Opening
104 . . . Meter supporting portion (third electric-component supporting portion)
123 . . . Upper-portion triangular frame body (first frame body)
123A, 123B, and 123C . . . Apex
131 . . . Trapezoidal frame body (second frame body)

The invention claimed is:

1. A stay for a saddle riding vehicle disposed on a front portion of a body frame,
wherein the stay includes a first frame body having a triangular shape,
at least a part of a first electric-component supporting portion is disposed inward of the first frame body, and
one apex among apices of the first frame body is oriented to a vehicle front side,
wherein the stay comprises a frame-body supporting portion made of a tube material that extends from the body frame to the vehicle front side, and that couples the one apex of the first frame body and the body frame directly.

2. The stay for a saddle riding vehicle according to claim 1,
wherein the frame-body supporting portion includes an exterior-component supporting portion that supports an exterior component.

3. The stay for a saddle riding vehicle according to claim 2,
wherein the first frame body and the first electric-component supporting portion are formed of respective frame bodies having openings, and the openings are disposed adjacent to one another.

4. The stay for a saddle riding vehicle according to claim 2,
wherein the stay for a saddle riding vehicle includes a second frame body using one side of the first frame body, the second frame body being different from the first frame body, and
the second frame body is mounted on the body frame via a second electric-component supporting portion.

5. The stay for a saddle riding vehicle according to claim 1,
wherein the first frame body and the first electric-component supporting portion are formed of respective frame bodies having openings, and the openings are disposed adjacent to one another.

6. The stay for a saddle riding vehicle according to claim 5,
wherein the stay for a saddle riding vehicle includes a second frame body using one side of the first frame body, the second frame body being different from the first frame body, and
the second frame body is mounted on the body frame via a second electric-component supporting portion.

7. The stay for a saddle riding vehicle according to claim 1,
wherein the first frame body includes an exterior-component supporting portion that supports an exterior component, and the exterior-component supporting portion is detachable from and attachable to the first frame body.

8. The stay for a saddle riding vehicle according to claim 7,
wherein the exterior-component supporting portion is supported to the apex of the first frame body.

9. A stay for a saddle riding vehicle disposed on a front portion of a body frame,
wherein the stay for a saddle riding vehicle includes a first frame body having a triangular shape, and
at least a part of a first electric-component supporting portion is disposed inward of the first frame body,
wherein the stay for a saddle riding vehicle includes a second frame body using one side of the first frame body, the second frame body being different from the first frame body, and
the second frame body is mounted on the body frame via a second electric-component supporting portion.

10. The stay for a saddle riding vehicle according to claim 9, comprising
a third electric-component supporting portion supported with one side of the second frame body and the first electric-component supporting portion.

11. The stay for a saddle riding vehicle according to claim 10,
wherein the frame-body supporting portion, one side of the first frame body, and one side of the second frame body form a triangular shape in a side view.

12. The stay for a saddle riding vehicle according to claim 10,
wherein the frame-body supporting portion is coupled to the second electric-component supporting portion, and
the frame-body supporting portion, the second electric-component supporting portion, and the body frame form a triangular shape in a side view.

13. The stay for a saddle riding vehicle according to claim 9,
wherein the frame-body supporting portion, one side of the first frame body, and one side of the second frame body form a triangular shape in a side view.

14. The stay for a saddle riding vehicle according to claim 9,
wherein the frame-body supporting portion is coupled to the second electric-component supporting portion, and
the frame-body supporting portion, the second electric-component supporting portion, and the body frame form a triangular shape in a side view.

15. A stay for a saddle riding vehicle disposed on a front portion of a body frame,
wherein the stay for a saddle riding vehicle includes a first frame body having a triangular shape,
one apex of apices of the first frame body is oriented to a vehicle front side, and
a first electric-component supporting portion is formed inside, in the vehicle width direction, two apices that are positioned at left and right rear end portions of the first frame body.

\* \* \* \* \*